US005244741A

United States Patent [19]

Nagano et al.

[11] Patent Number: 5,244,741

[45] Date of Patent: Sep. 14, 1993

[54] DEVELOPING ROLLER OF MONOCOMPONENT DEVELOPING SYSTEM

[75] Inventors: Hisatsugu Nagano, Mito; Takeo Araki, Isehara; Fumio Okuya, Sagamihara; Tsuyoshi Imamura, Hachioji; Kyoichi Ashikawa, Sagamihara, all of Japan

[73] Assignee: Ricoh Company, Ltd., Tokyo, Japan

[21] Appl. No.: 853,270

[22] Filed: Mar. 18, 1992

[30] Foreign Application Priority Data

Mar. 22, 1991 [JP] Japan .............................. 3-016952[U]
Oct. 11, 1991 [JP] Japan .............................. 3-263380

[51] Int. Cl.$^5$ .............................. B32B 15/08

[52] U.S. Cl. .............................. 428/461; 428/458; 428/463; 430/47

[58] Field of Search .............. 428/195, 461, 458, 463; 430/47

[56] References Cited

U.S. PATENT DOCUMENTS 4,027,049 5/1977 Masuda et al. .............................. 430/47
5,073,434 12/1991 Frank et al. .............................. 428/195

*Primary Examiner*—Thomas J. Herbert, Jr.
*Attorney, Agent, or Firm*—Oblon, Spivak, McClelland, Maier & Neustadt

[57] ABSTRACT

A developing roller of monocomponent developing system, in which a low hygroscopic material is used for a dielectric layer, thereby suppressing a change of electric properties of the layer caused by water absorption, that is, a dielectric layer using a low hygroscopic material, namely, a low hygroscopic elastomer or a low hygroscopic polymer is used at an outer surface of a conductive supporting body where, as a concrete example of the elstomer or the polymer, polyethylene, polypropylene, ethylenic copolymer, rigid polyvinyl chloride, fluoro resin, acetal resin or mixtures thereof, or the elastomer or the polymer in which manganese-aluminum magnet, strontium ferrite, barrium ferrite of mixtures thereof is dispersed.

2 Claims, 5 Drawing Sheets

DEVELOPING ROLLER OF MONOCOMPONENT DEVELOPING SYSTEM

BACKGROUND OF THE INVENTION

The present invention concerns an improvement for a developing roller of monocomponent developing system used in image forming apparatus such as copying machines, printers and facsimile units.

Heretofor, as a suitable developing system for realizing an image forming apparatus small in size and light in weight, there has been known a monocomponent developing system which does not use carriers usually applied in the two component developing system.

A developing roller of the monocomponent system comprises a core metal (conductive supporting body) and a dielectric layer formed at an outer surface of the core metal, and as an example of the layer, a resin layer can be exemplified.

Further, there is a roller of the monocomponent developing system having a three layer, namely, a core metal, a dielectric layer and a float electrode (conductive, about 100 $\mu$m diameter), which is disposed on a surface of the layer to provide the same effect as an electrode effect caused by carriers in a two component developing system. The three-layer roller has an excellent grading property and simultaneously an excellent reproducibility for low contrast characters.

Among developing rollers of the monocomponent developing system, there is a roller which is given a magnetic force for a toner transportation and also for a reduction of toner layer thickness. These rollers can form a stable image of high quality by stabilizing their electric properties and limiting the properties in a certain range.

However, working circumstances of image forming apparatus have recently changed remarkably because a use of the apparatus being small and inexpensive are become very much popular recently. In spite of the above fact, there has been no sufficient consideration for a hygroscopic property (water absorption) of a resin forming a dielectric layer of conventional monocomponent developing roller. Accordingly, water absorption of the dielectric layer very much increases under high temperature and humidity as shown in FIG. 7 taking ethylene-propylenediene-methylene rubber (hereinafter referred to as "EPDM") as an example.

When the water absorption of the dielectric layer changes greatly depending upon its working circumstance, electric properties of the developing roller of monocomponent system, for instance, its volume resistivity, change greatly (see FIG. 8). As the result, amount of toner adhered to the roller or an electric charge of toner varies during development and transferred amount of toner from the roller to a light sensitive body fluctuates bringing problems of having irregularities development concentration and unstable image.

Practically, although there are various kinds of developing rollers having relatively susceptible volume resistivity and having relatively unsusceptible one to a change of water absorption of the rollers, in any way, as far as the change is big, most kinds of rollers are forced to change their resistivity and influence properties of the roller. When a material, such as polyamide (nylon), showing a big change of water absorption depending upon circumstantial conditions is used, a change of the volume resistibity becomes remarkable and such material can not be used in practical application. (Refer to FIGS. 9*a* and 9*b*).

Further, as to electric properties of the roller, especially a volume resistivity of the roller, which become necessary depending on conditions of a developing process, particularly properties of photosensitive body or toner, it is sometimes requested to be, for example, $10^8 \sim 10^{13}$ Ω.cm, much lower than the resistivity of $10^{13} \sim 10^{16}$ Ω.cm which many resins generally have. In order to meet the requirement, barium ferrite, strontium ferrite or maganese-aluminum magnet is sometimes mixed with a resin. However, even in this case, if water absorption of the resin is high, its electric properties change similarly as above and become meaningless in practical use.

The present inventors have made an earnest study for dissolving the foregoing problems and, as a result, have found that these problems have effected by a water absorption in the dielectric layer of the developing roller of monocomponent developing system. Based on the finding they have accomplished the present invention.

SUMMARY OF THE INVENTION

An object of the present invention is to provide a developing roller of monocomponent developing system comprising an electroconductive supporting body and a dielectric layer being disposed on an outer surface of the body, in which the layer comprises a low hygroscopic elastomer or a low hygroscopic polymer.

Another object of the present invention is to provide a developing roller of monocomponent developing system of which volume resistivity changes only slightly with a change of circumstantial conditions, in particular, temperature and humidity.

A further object of the present invention is to provide a developing roller of monocomponent developing system capable of stable development even when the conditions of working circumstances change.

A further object of the present invention is to provide a developing roller of monocomponent developing system which is suitable to an image forming apparatus small in size and light in weight.

A still further object of the present invention is to provide a developing roller of monocomponent developing system having a relatively low volume resistivity, of which dielectric layer is dispersed with strontium ferrite, barium ferrite, manganese-aluminum magnetic or mixtures thereof.

BRIEF DESCRIPTION OF THE DRAWINGS

FIG. 9 is a graph illustrating a relationship between volume resistivity and water absorption of a conventional dielectric layer of a developing roller of monocomponent developing system using highly hygroscopic resin.

DETAILED DESCRIPTION OF THE INVENTION

Figure 1:
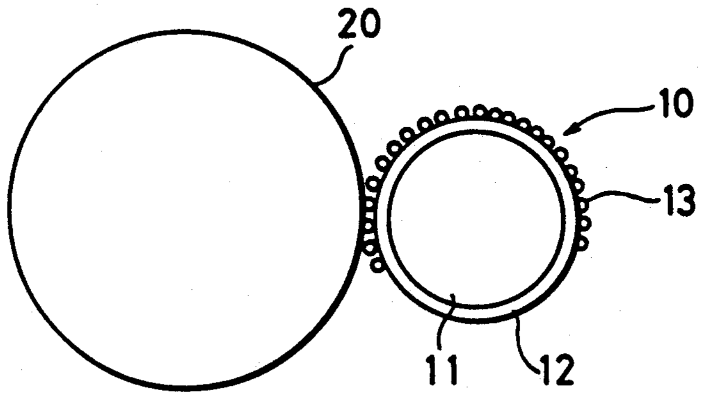
FIG. 1 is a schematic constitutional view illustrating an embodiment of a developing roller of monocomponent developing system according to the present invention.

The term "resin" used in the present invention means elastomers and polymers collectively.

Further, "water absorption" used in the present invention is a value of an amount of water absorbed expressed in % by weight.

Still further, in the present invention, a volume resistivity of the developing roller of monocomponent developing system is represented as $\rho_{min}$ Ω.cm when its dielectric layer is dried and as $\rho_{max}$ Ω.cm when the layer is saturated with water under certain circumstantial conditions (temperature and relative humidity), and change in volume resistivity is represented by the equation:

$$\log\rho_{max} - \log\rho_{min}.$$

The present invention provides an image forming apparatus small in size, light in weight and being capable of exhibiting stable images even when its working circumstantial conditions change remarkably, by suppressing a fluctuation of electric properties of the developing roller caused by water absorption therein, which is effected by using a low hygroscopic material for the dielectric layer.

More specifically, the present invention provides a developing roller of monocomponent developing system, in which a dielectric layer is disposed at the outer surface of an electroconductive supporting body, wherein the dielectric layer is constituted with a low hygroscopic elastomer or a low hygroscopic polymer.

The low hygroscopic material referred herein is a material having a saturated water absorption of less than 1.0% by weight under the conditions of 30° C. and 80% R.H. As preferable low hygroscopic resins, polyethylene (hereinafter referred to as "PE"), polypropylene (hereinafter referred to as "PP"), ethylenic copolymer (hereinafter referred to as "EEA"), rigid polyvinyl chloride (hereinafter referred to as "rigid PVC"), fluoro resin, acetal resin and mixtures thereof can be exemplified and as particularly preferable resin, PE, PP, EEA and mixtures thereof can also be exemplified.

Further, manganese-aluminum magnet, strontium ferrite, barium ferrite or mixtures thereof can be dispersed in these low hygroscopic resins.

In other words, in the present invention, since the dielectric layer, constituted with a low hygroscopic resin material, absorbs water only slightly, fluctuation of electric properties of the developing roller of monocomponent developing system due to water absorption of the dielectric layer is suppressed and accordingly the roller can perform stable development even if the working circumstances change remarkably.

Further, when particularly preferable resin, exemplified above, is used, the layer becomes less hygroscopic than other resins and accordingly fluctuation of electric properties of the developing roller of monocomponent system is reduced.

Furthermore, when the magnet or the ferrite described above is dispersed in the resin, electric properties of the developing roller, for example, volume resistivity can be controlled and at the same time the roller can have a magnetic force and the electric properties are stabilized since the roller absorbs water only slightly. Moreover, freedom of image forming system can be improved.

EXAMPLE

The present invention will now be described referring to the drawings.

Figure 2:
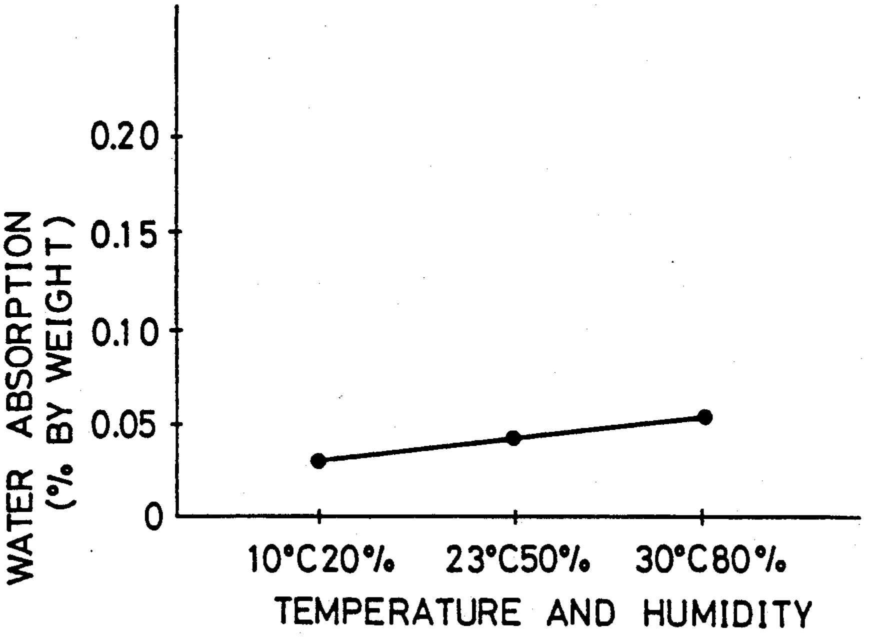
FIG. 2 is a graph illustrating a relationship between circumstantial conditions and water absorption of the dielectric layer in the developing roller of monocomponent developing system according to the present invention using polypropylene as an example of a low hygroscopic resin.
Figure 3:
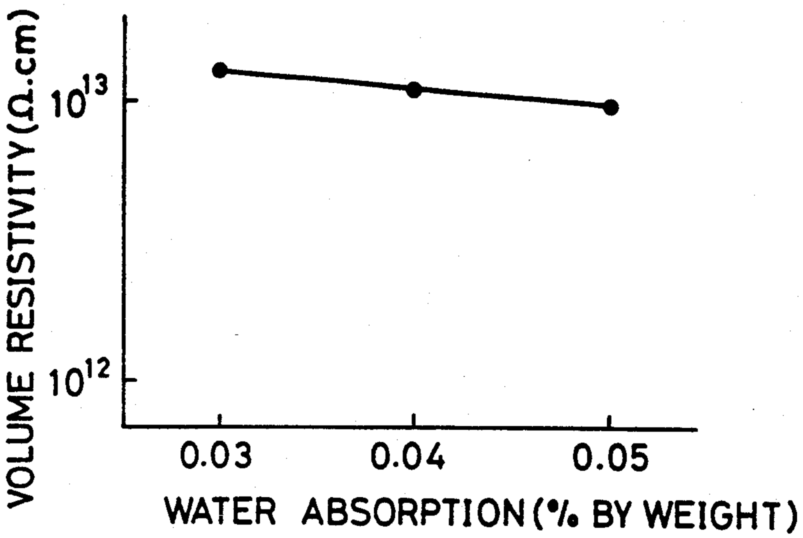
FIG. 3 is a graph illustrating a relationship between volume resistivity and water absorption of the dielectric layer in the developing roller of monocomponent developing system of FIG. 2.

FIGS. 1 to 3 are showing and illustrating an example of a developing roller of monocomponent developing system according to the present invention.

In FIG. 1, 10 is a developing roller of monocomponent developing system in this example, 11 is a core metal (electroconductive supporting body) thereof and 12 is a dielectric layer formed at an outer surface of the core metal 11. The developing roller 10 is in contact with a toner container of a developing device being not shown in the figure and also disposed closely to a photosensitive drum 20. On a side of the roller contacting the toner container of the developing device, the developing roller 10 is deposited on the surface with a uniform toner layer 13, for example, by a blade givin thin layer of toners. On the side disposing closely to the light sensitive drum 20, the developer roller 10 brings the toner layer 13 close to an electrostatic latent image formed on the surface of the drum 20 and transfer the toner on the image. In such developing operation, a predetermined developing bias voltage is applied between the core metal 11 of the roller 10 and a base layer (not shown in the figure) of the drum 20. Since such a so-called electrophotographic image forming process is known, any further detailed description will not be necessary.

Figure 4:
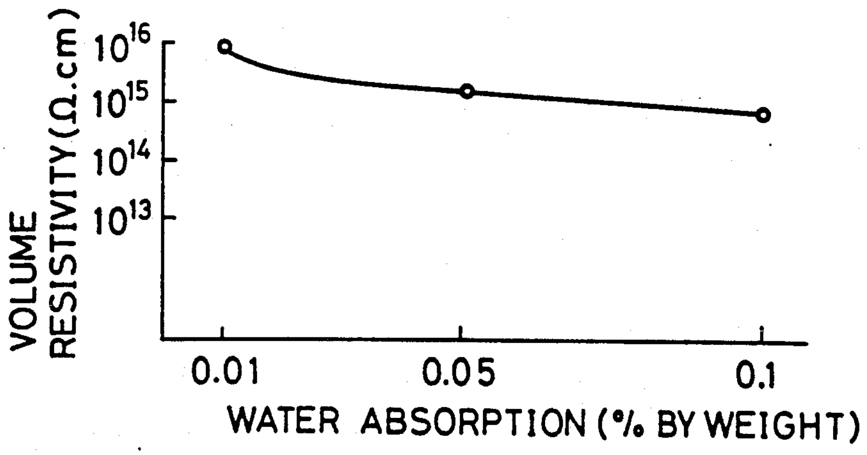
FIG. 4 is a graph illustrating a relationship between the volume resistivity and the water absorption of the dielectric layer in the developing roller of monocomponent developing system according to the present invention in which an ethylene copolymer (hereinafter refer to as "EEA") is used as an another example of a low hygroscopic resin.

On the other hand, the dielectric layer 12 is formed with a material using a low hygroscopic elastomer or a low hygroscopic polymer, for example, a material comprising PP as a base polymer. As shown in FIG. 2, the saturated water absorption of the dielectric layer 12 under a temperature of 30° C. and a humidity of 80% is less than 0.1% by weight, and a change of the water absorption depending on a change of circumstantial conditions is extremely small. The base polymer referred to in the present invention means a polymer or an elastomer in which ferrite etc. is dispersed and which can be used either alone or as a mixture. Accordingly, as shown in FIG. 3, a change in the volume resistivity (change in electric properties) of the developing roller 10 is reduced extremely. Such an effect of reducing the change (difference) of the electric properties of the dielectric layer 12 depending on the circumstantial change (or difference of the circumstantial conditions) was confirmed also when the dielectric layer 12 was formed by using other material, for example, low hygroscopic resin such as PE and EEA (refer to FIG. 4). Further, a similar effect was also confirmed by using respective mixtures PP, PE and EEA.

Figure 5:
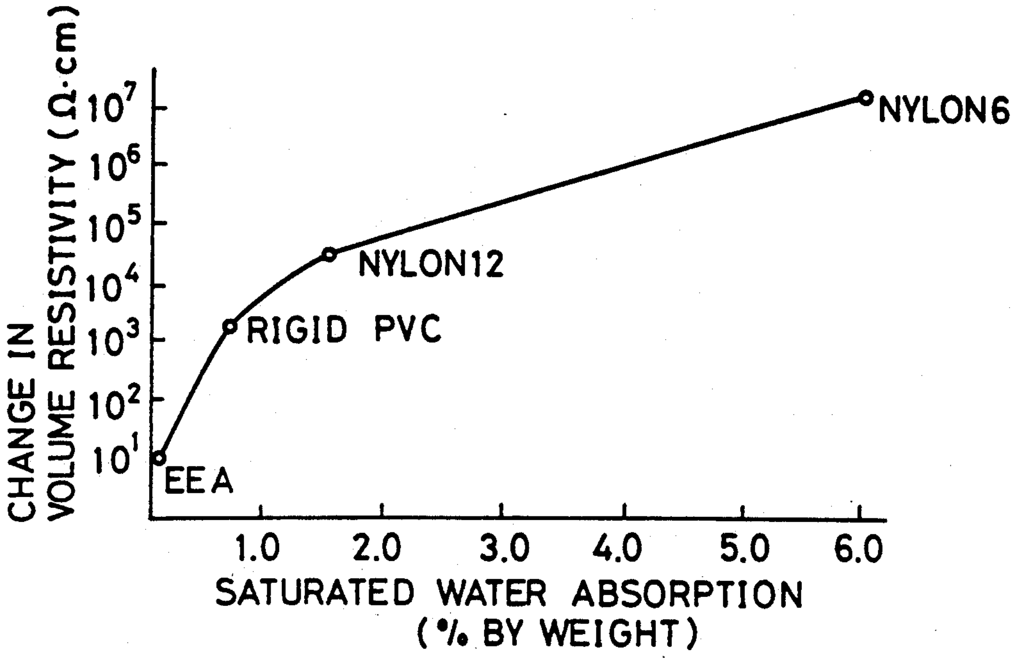
FIG. 5 is a graph illustrating a relationship between a saturated water absorption, at 30° C., 80% Relative Humidity (hereinafter referred to as R.H.), of dielectric layers using resins of various hygroscopic properties and difference in volume resistivity of the developing rollers of monocomponent developing system using such dielectric layers.

A low hygroscopic elastomer or a low hygroscopic polymer in the present invention means a material, which comprises the dielectric layer 12, having small changing amount of the water absorption (low saturated water absorption) so that an amount of change in the volume resistivity of the roller 10 is lower than about 4, since this value, about 4, is the upper limit to use the material for the roller 10 of the present invention. Practically, the amount of change in the volume resistivity is reduced to less than 4, as shown in FIG. 5, when the saturated water absorption of the resin under the circumstantial conditions of 30° C. and 80% R.H. is less than about 1.0% by weight (in the figure, ethylene copolymer and rigid polyvinyl chloride are included within the range) and, low hygroscopic material such as PP or EEA in this example is more preferable.

Figure 6:
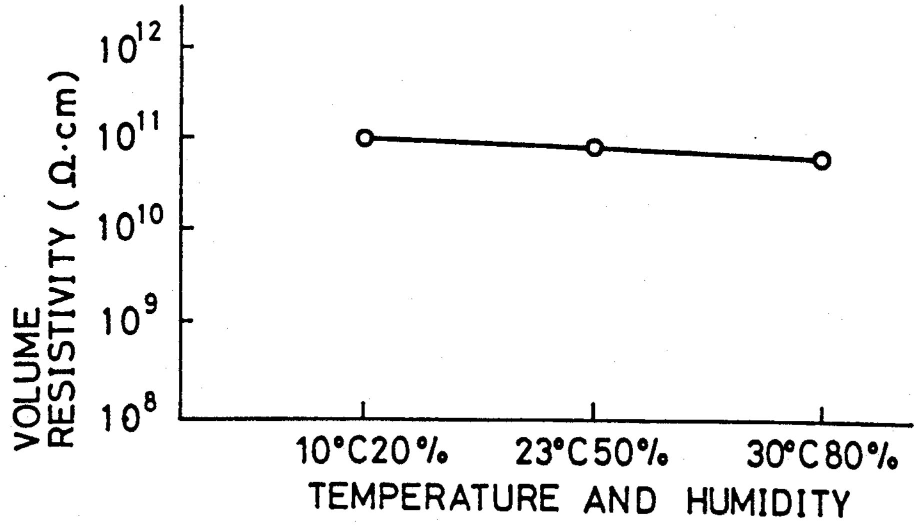
FIG. 6 is a graph illustrating a relationship between circumstantial conditions and volume resistivity of the developing roller of monocomponent developing system according to the present invention in which the volume resistivity is lowered by dispersing barium ferrite into a low hygroscopic resin comprising the dielectric layer.
Figure 7:
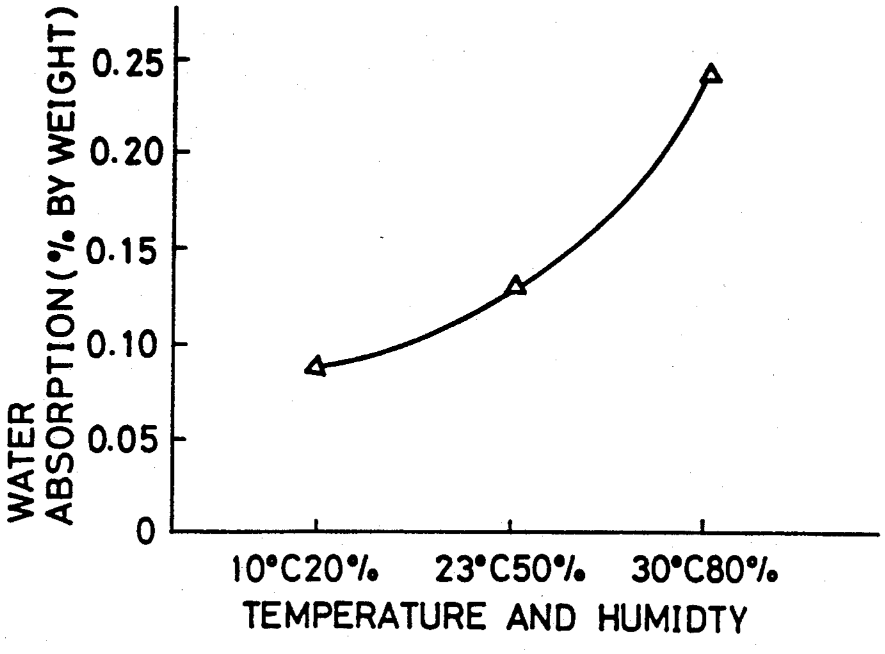
FIG. 7 is a graph illustrating a relationship between circumstantial conditions and water absorption of a dielectric layer using EPDM as an example of a resin used in a conventional developing roller of monocomponent developing system.
Figure 8:
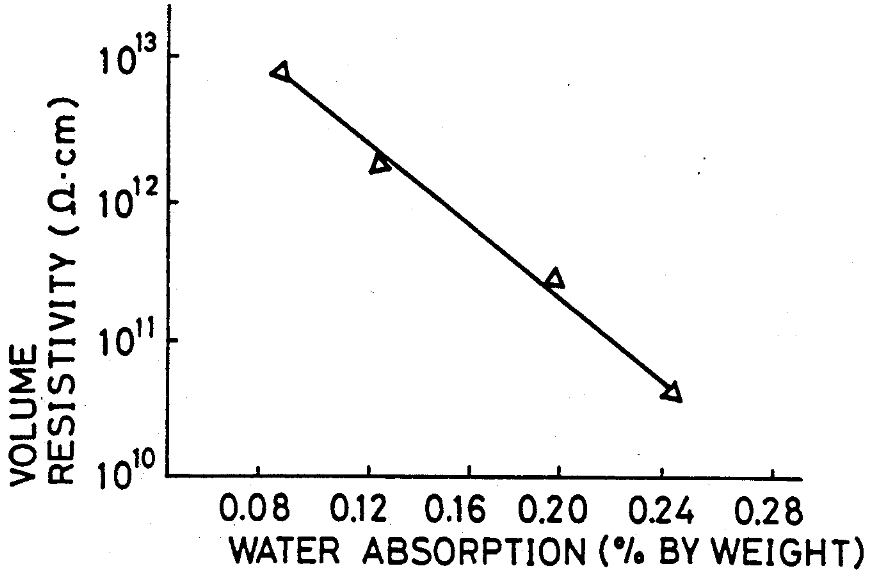
FIG. 8 is a graph illustrating a relationship between volume resistivity and water absorption of the dielectric layer, using EPDM, of the developing roller of monocomponent developing system of FIG. 7.
Figure 9A:
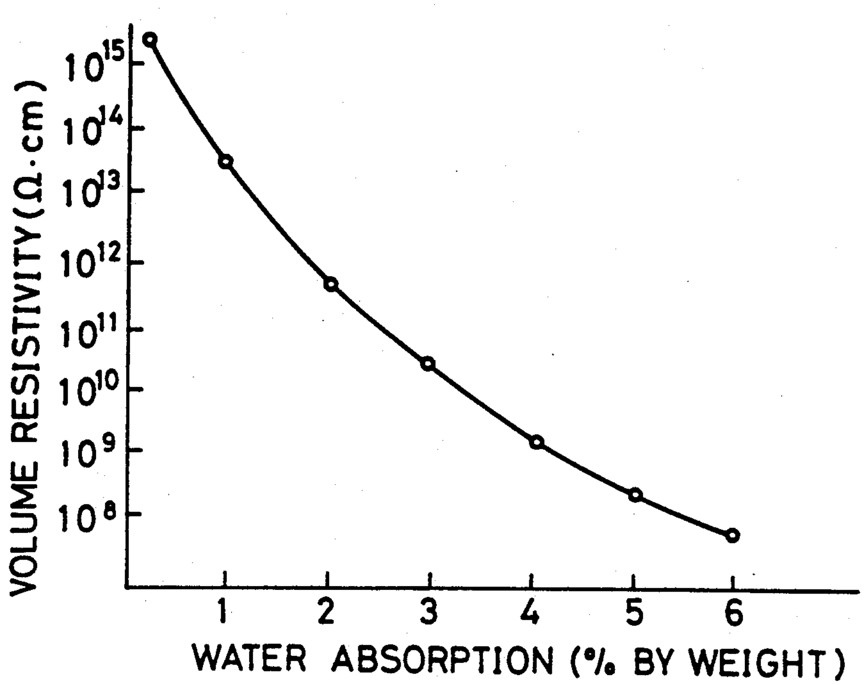
FIG. 9*a* is a graph showing a case using nylon 6 and FIG. 9*b* is using nylon 12.
Figure 9B:
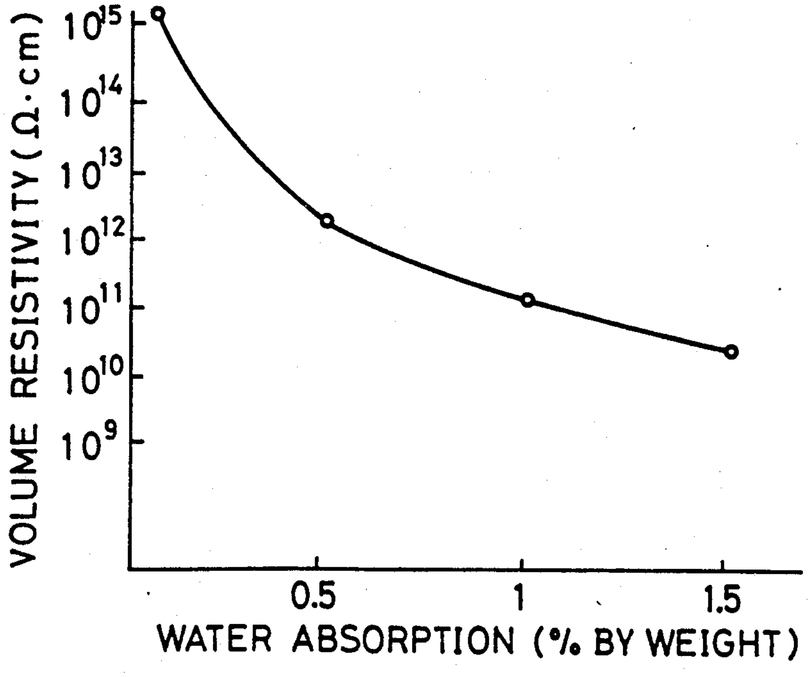

Further, depending on the image-forming process, there is a case when reducing the volume resistivity to a lower value (for example, $10^8$ to $10^{13}$ Ω.cm) and providing magnetic force to the roller 10 is more preferable. For this purpose, it is necessary to disperse barium ferrite, strontium ferrite or a manganese-aluminum magnet in the dielectric layer 12, Further, it is also necessary that the base polymer in the dielectric layer has a low hygroscopic ratio as in the example described before. FIG. 6 is a graph illustrating an example thereof a change of the volume resistivity of the developing roller of monocomponent developing system depending on a change of the circumstantial conditions (temperature and humidity), of which roller comprises EEA (low hygroscopic) containing 80% by volume of barium ferrite to make its volume resistivity low.

What is claimed is:

1. A developing roller of monocomponent developing system in which a dielectric layer is formed at an outer surface of an electroconductive supporting body, wherein the dielectric layer comprises a low hygroscopic elastomer or a low hygroscopic polymer each having a saturated water absorption of less than 1.0% by weight under the conditions of 30° C. and 80% R.H.

2. A developing roller of monocomponent developing system in which a dielectric layer is formed at an outer surface of an electroconductive supporting body, wherein the dielectric layer is selected from the group consisting of polyethylene and polypropylene.

* * * * *